United States Patent
Riportella

(12) 
(10) Patent No.: US 6,578,900 B1
(45) Date of Patent: Jun. 17, 2003

(54) PORTABLE VEHICLE SHADE

(76) Inventor: Daniel Joseph Riportella, 70 Sabra Ave., Oak Park, CA (US) 91377

( * ) Notice: Subject to any disclaimer, the term of this patent is extended or adjusted under 35 U.S.C. 154(b) by 0 days.

(21) Appl. No.: 10/201,099

(22) Filed: Jul. 23, 2002

Related U.S. Application Data

(60) Provisional application No. 60/313,127, filed on Aug. 16, 2001.

(51) Int. Cl.[7] .................................................. B60J 11/00
(52) U.S. Cl. .................. 296/136; 296/95.1; 160/370.21; 160/DIG. 2; 150/166
(58) Field of Search ................................ 296/136, 95.1, 296/97.1, 97.8, 97.9; 160/370.21, 370.23, DIG. 2; 135/115, 88.01, 88.09; 150/166

(56) References Cited

U.S. PATENT DOCUMENTS

| | | | |
|---|---|---|---|
| 3,476,032 A | | 11/1969 | Mattly |
| 3,876,245 A | | 4/1975 | Lowery |
| 3,957,301 A | | 5/1976 | Huber |
| 3,992,053 A | | 11/1976 | Hrytzak et al. |
| 4,068,885 A | | 1/1978 | Berger |
| 4,164,233 A | | 8/1979 | McAndrew |
| 4,684,165 A | | 8/1987 | Becker |
| 4,805,654 A | | 2/1989 | Wang |
| 4,825,889 A | * | 5/1989 | Monteith ..................... 135/119 |
| 4,929,016 A | * | 5/1990 | Kastanis ..................... 296/136 |
| 4,998,768 A | | 3/1991 | Wu |
| 5,244,246 A | | 9/1993 | Cunningham |
| 5,275,460 A | * | 1/1994 | Kraus ......................... 150/166 |
| 5,401,074 A | * | 3/1995 | Timerman ............... 160/370.21 |
| 5,435,362 A | * | 7/1995 | Chiang ........................ 150/166 |
| 5,454,499 A | | 10/1995 | Gibbs |
| 5,516,181 A | | 5/1996 | Thompson |
| 5,558,145 A | | 9/1996 | Baka |
| 5,638,642 A | * | 6/1997 | Nemec ......................... 150/166 |
| 5,664,825 A | * | 9/1997 | Henke et al. ................ 150/166 |
| 5,697,416 A | * | 12/1997 | Bock et al. .................. 150/168 |
| 5,700,048 A | | 12/1997 | Wade et al. |
| 5,762,393 A | | 6/1998 | Darmis, Sr. |
| 5,941,594 A | * | 8/1999 | O'Neill ....................... 150/166 |
| 6,012,759 A | | 1/2000 | Adamek |
| 6,056,347 A | * | 5/2000 | D'Adamo .................... 296/136 |
| 6,059,010 A | | 5/2000 | Yang |
| 6,168,225 B1 | | 1/2001 | Deng et al. |
| 6,237,983 B1 | | 5/2001 | Yang |
| 6,257,259 B1 | | 7/2001 | Ardouin |
| 6,276,742 B1 | | 8/2001 | Deng et al. |

* cited by examiner

*Primary Examiner*—D. Glenn Dayoan
*Assistant Examiner*—Patricia Engle
(74) *Attorney, Agent, or Firm*—Michael Blaine Brooks, P.C.; Michael B. Brooks

(57) ABSTRACT

A portable shade assembly for vehicle that includes an elongated, wide fabric sunscreen member having weights provided along the bottom of the opposed shorter side edges thereof, and a number of gap-producing spacer members, of cylindrical or elongated polyhedral shape, attached to the vehicle-facing surface of the sunscreen; each of the spacer members includes an attachment strap extending from each end thereof that are adapted to be secured between a proximate door and its door jam of a vehicle such that when the door of the vehicle is in the closed position, the sunscreen members is secured to the vehicle.

56 Claims, 6 Drawing Sheets

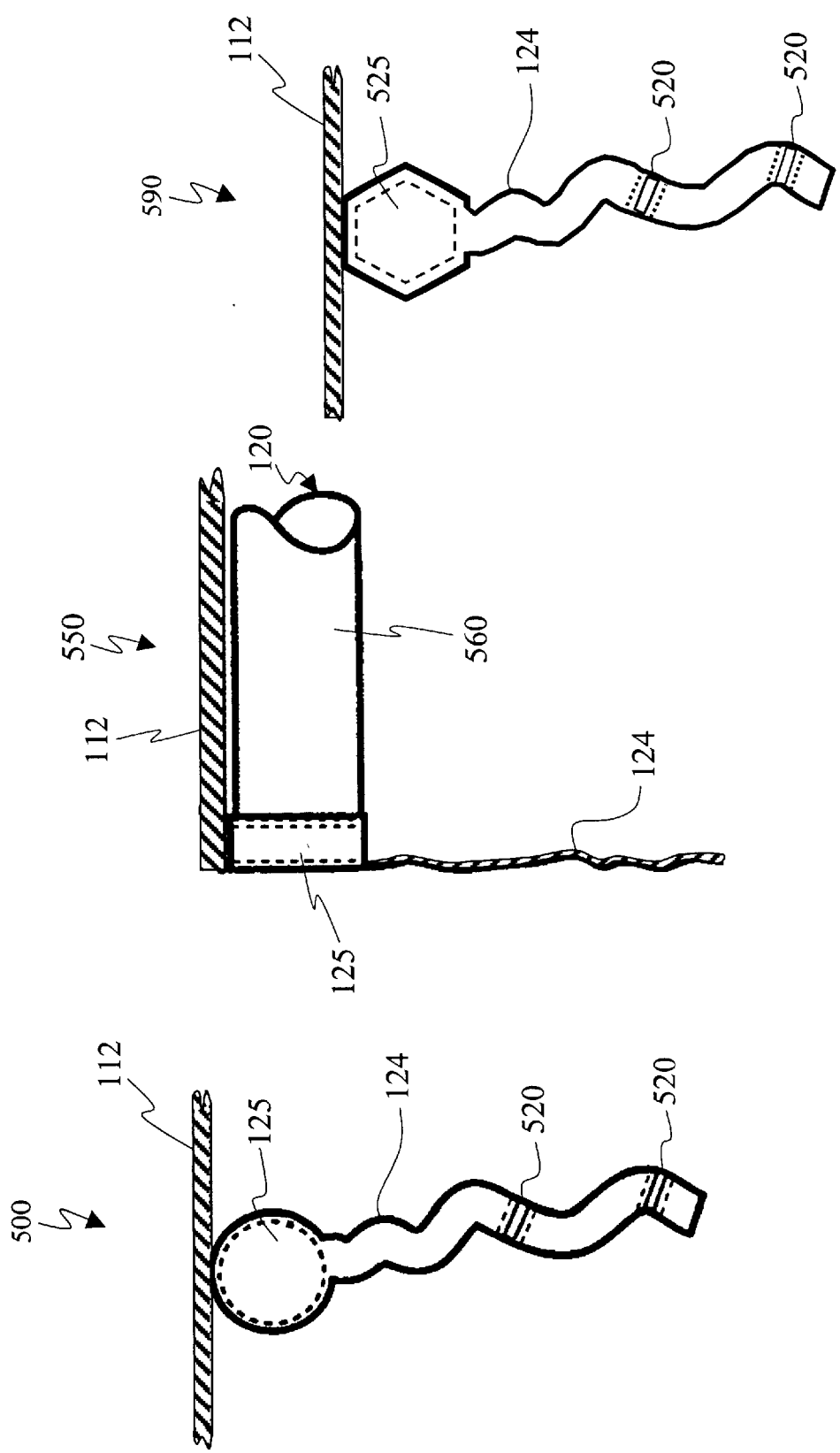

PORTABLE VEHICLE SHADE

CROSS-REFERENCE TO RELATED APPLICATION

This application claims benefit of the following U.S. Provisional Patent Application, the disclosure of which, including all appendices and all attached documents, is hereby incorporated by reference herein, in its entirety, for all purposes: U.S. Provisional Patent Application Ser. No. 60/313,127, to Danny Riportella entitled, "VEHICLE SHADE ASSEMBLY" filed Aug. 16, 2001.

BACKGROUND

1. Field of the Invention

The present invention relates to shade and covering assemblies and covering devices for vehicles and more particularly to a portable shade assembly for a vehicle.

2. Description of the Prior Art

When a vehicle is subjected to direct sunlight, it can have a rapid and large heat buildup within the interior passenger compartment. This heat buildup can be uncomfortable for the driver and passengers of the vehicle and can take several minutes to alleviate, either by driving with the windows down or merely waiting for the vehicle air conditioning system to remove the heat, or both.

It is desirable, therefore, to provide a heat shield system attachable to a vehicle that shields the top portion of the passenger compartment and the front and back windshields such that they are protected from direct sunlight. In addition, it is desirable to provide an air passageway between the heat shield and the vehicle roof such that while the heat shield absorbs radiated heat from the sun, air passing between the heat shield and the vehicle top convectively dissipates the heat thereby substantially reducing the heat from being conductively and convectively transferred to the vehicle top and then on to the passenger compartment. It is a further object of the present invention to provide a portable, easy to install, shade assembly for a vehicle.

SUMMARY

The several embodiments of the present invention provide a portable shade assembly for vehicle that includes an elongated, wide fabric sunscreen member having weights provided along the bottom of the opposed shorter side edges thereof, and a number of gap-producing spacer members of cylindrical or elongated polyhedral shapes, attached to a vehicle facing surface of the sunscreen member; each of the spacer members includes an attachment strap extending from each end thereof wherein each strap is adapted to be secured between a proximate door and its door jam of a vehicle such that when the door of the vehicle is closed, the sunscreen member is secured to the vehicle.

BRIEF DESCRIPTION OF THE DRAWINGS

For a further understanding of the nature and objects of he present invention, reference should be made to the following detailed description, taken in conjunction with the accompanying drawings, in which like elements are given the same or analogous reference numbers and wherein:

FIG. 5A is a side view of a portion of the portable shade assembly for vehicle of the present invention illustrating the cover sheet, roll and strap assembly;

FIG. 5B is a front view of a portion of the portable shade assembly for vehicle of the present invention illustrating the cover sheet, roll and strap assembly;

FIG. 5C is a side view of a portion of the portable shade assembly for vehicle of the present invention illustrating the cover sheet, polyhedron-shaped spacer member and strap assembly;

DETAILED DESCRIPTION OF THE PREFERRED EMBODIMENTS

Figure 1:
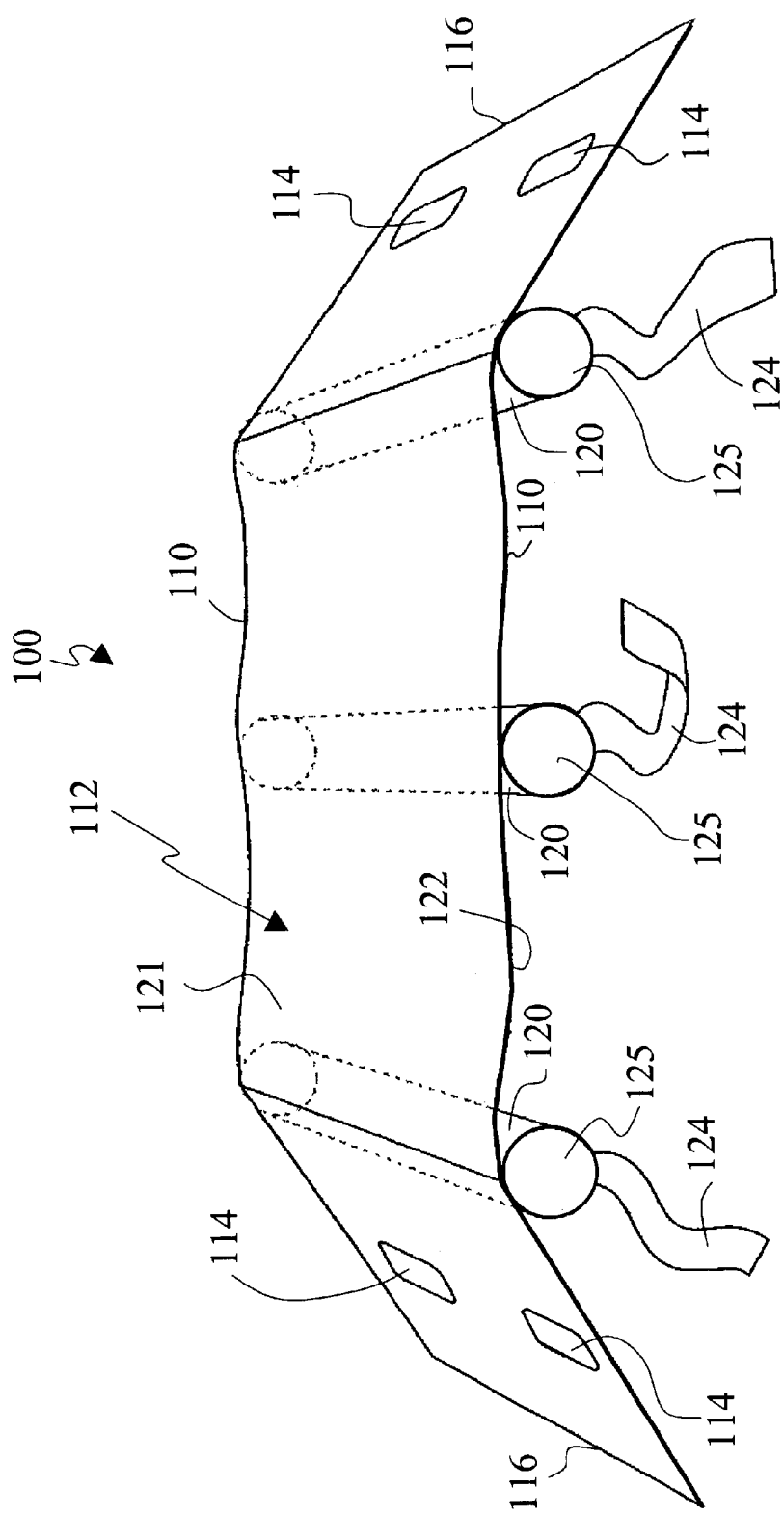
FIG. 1 is a perspective view of an exemplary embodiment of the portable shade assembly for vehicle of the present invention.

FIG. 1 is a perspective view of an exemplary embodiment of the portable shade assembly for vehicle of the present invention 100. The portable shade assembly for vehicle 100 includes a substantially rectangular fabric sunscreen member 112, having two long side edges 110 and two short side edges 116, a side in application facing the vehicle (not shown), i.e., the vehicle-facing surface 122, and a side in application facing away from the vehicle (not shown), i.e., the sky-facing surface 121. The sunscreen member 112 has weights 114 provided along the bottom of the opposed shorter side edges 116 thereof, and a number of gap-producing cylindrical-shaped foam spacer members 120 attached to a vehicle-facing surface 122 of the sunscreen sheet 112.

Each of the cylindrical-shaped foam spacer members 120 includes an attachment strap 124 extending from each end thereof, and preferably attached to a foam spacer member end cap 125 that are adapted to be secured between a door and door jam of a vehicle such that when the door of the vehicle is in the closed and locked position, the cylindrical-shaped foam spacer members 120 are secured to the vehicle (not shown). The cylindrical-shaped foam spacer members 120 traverse the width of the sunscreen member 112 at approximately one-third and two-thirds the length of the sunscreen member 112, with a third cylindrical-shaped foam spacer member 120, when used or a part of the embodiment, traversing the width of the sunscreen member 112 at approximately the middle length of the sunscreen member 112.

Figure 2:
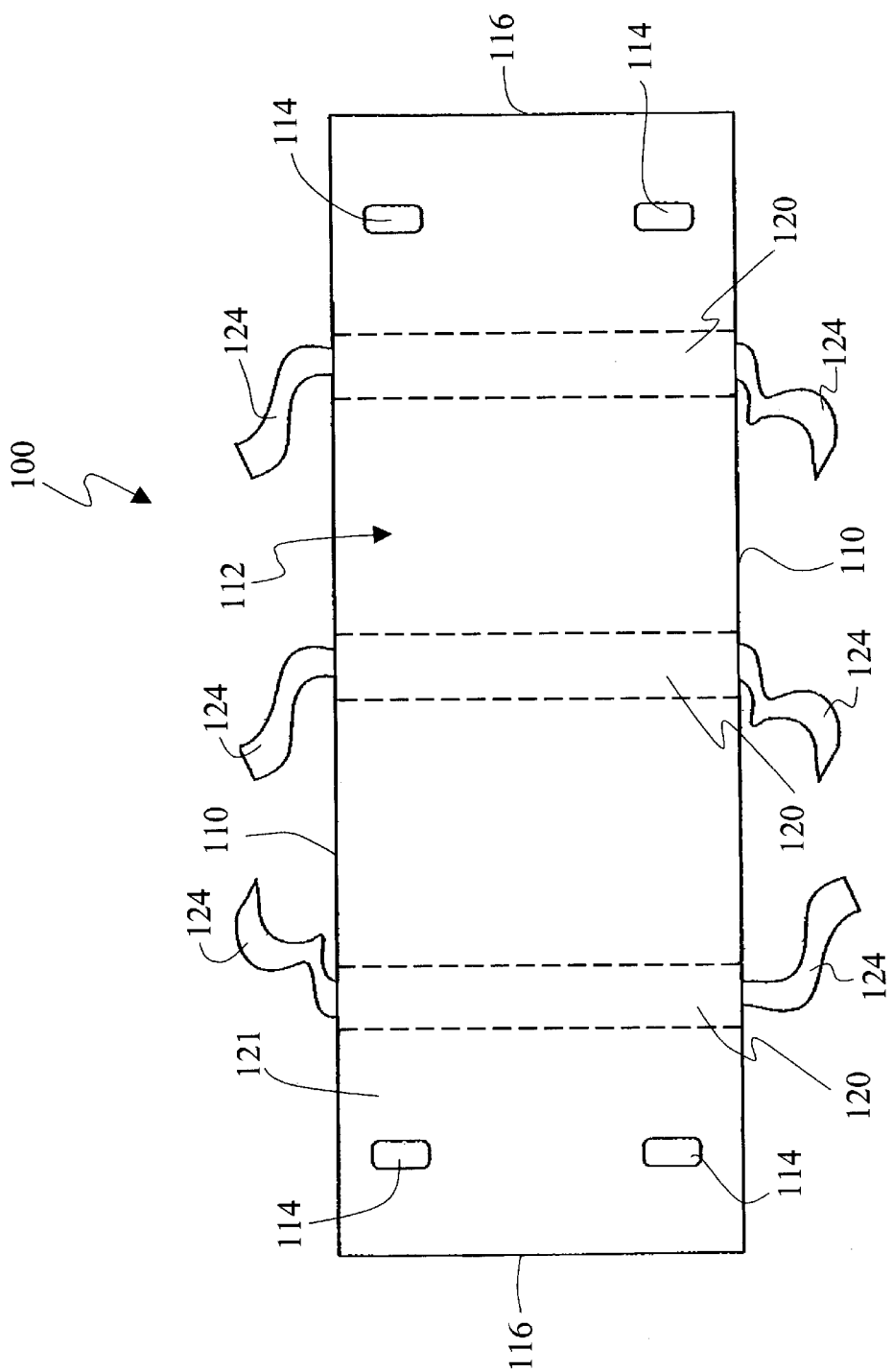
FIG. 2 is a top plan view of the portable shade assembly for vehicle of the present invention.

FIG. 2 is a top plan view of the portable shade assembly for vehicle of the present invention. Two stations are shown for weights 114 at each of the regions proximate to the shorter side edges 116. In the preferred embodiment, the sunscreen member 112 is a lightweight canvas fabric approximately four feet wide and fifteen feet long for standard domestic automobile sizes. Three cylindrical-shaped foam spacer members 120 are used to ensure the four-inch air gap.

Figure 3:
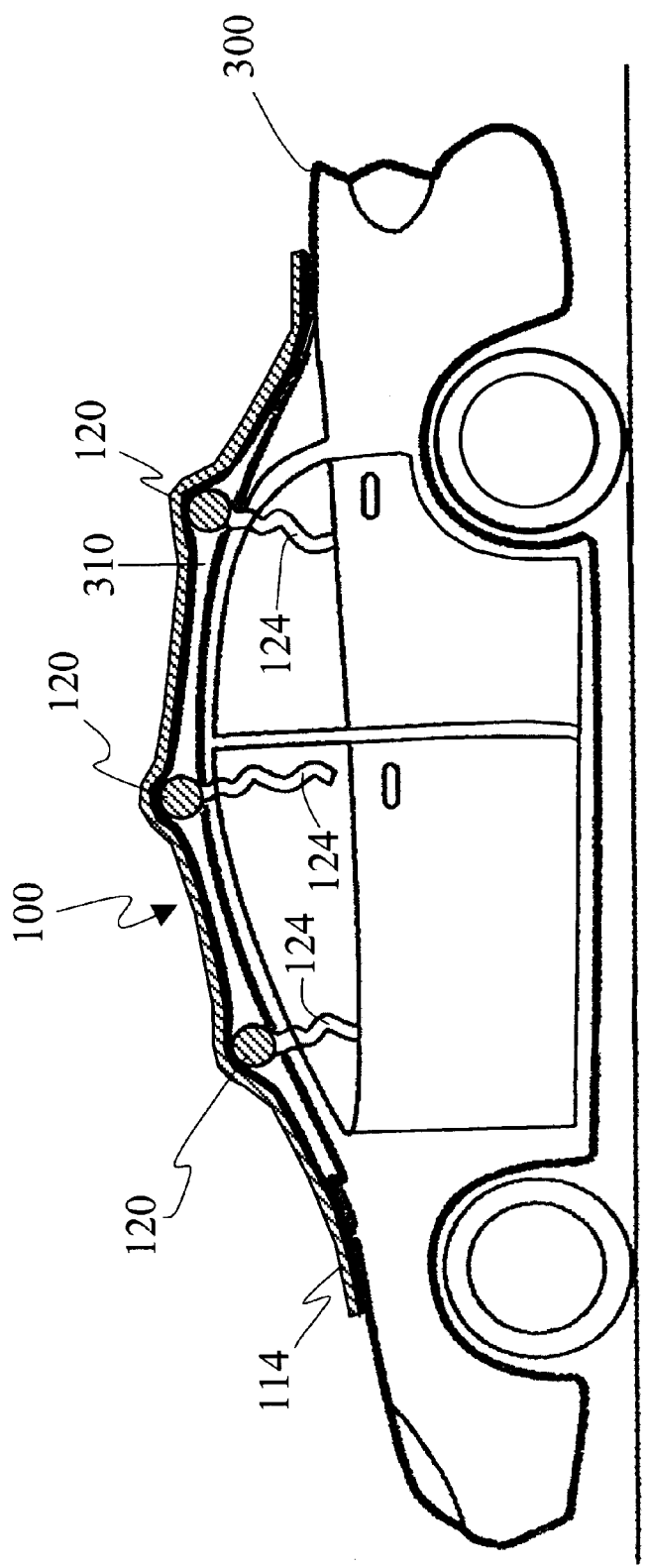
FIG. 3 is a side view for the portable shade assembly for vehicle of the present invention.

FIG. 3 is a side view for the portable shade assembly for vehicle of the present invention illustrating the portable shade assembly for vehicle 100 in an exemplary engagement with a four-door automobile 300. When the assembly 100 is used, the straps 124 are secured between the automobile doors and door jams with the leading portion of each strap fixedly attached to a cylindrical-shaped foam spacer member 120 and the trailing portion being with the automobile's interior. In the preferred embodiment of the gap-producing cylindrical-shaped foam spacer members 120 is a right cylinder of five inches in diameter and four feet in length comprised of extruded polyvinyl chloride open cell foam. Air gaps 310 are thereby provided in the space below the sunscreen member 112 and above the outside surface of the vehicle 300.

Figure 4:
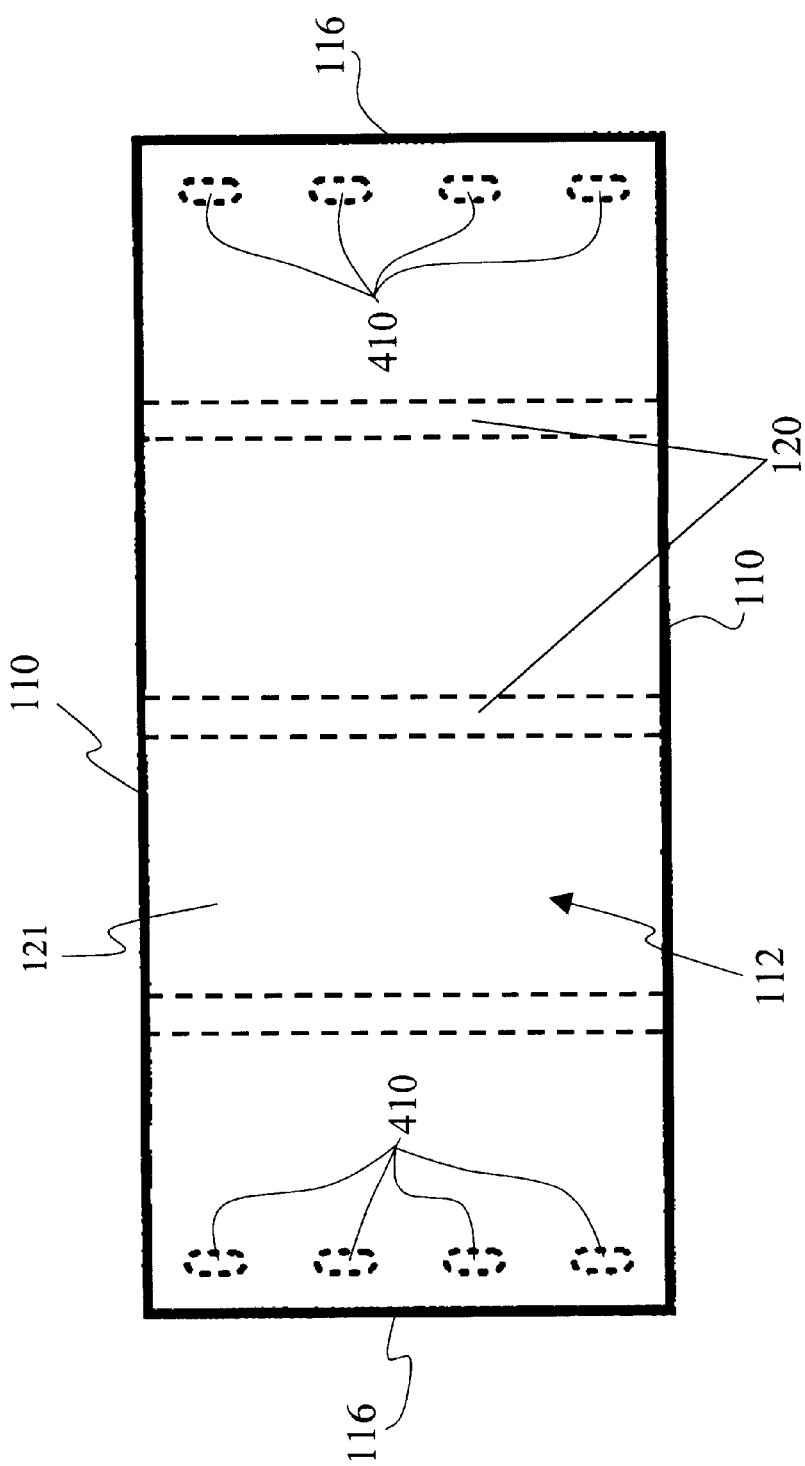
FIG. 4. is a top plan view of an alternative embodiment of the portable shade assembly for vehicle of the present invention.

FIG. 4. is a top plan view of an alternative embodiment of the portable shade assembly for vehicle of the present invention with the straps not shown. Four stations are shown 410 for each of the shorter side edges 116 for the embedding of weights, magnets or a combination of both or attached suction cups. While the preferable number stations ranges is two or more, their preferred respective locations from each of the shorter sides 116 is approximately six inches.

FIG. 5A is a side view of a portion of the portable shade assembly for vehicle of the present invention 500 illustrating the cover sheet, roll and strap assembly. An end of one of the cylindrical-shaped foam spacer members 120 is shown, its end being covered by an end cap 125. The end cap 125 is fixedly attached to sunscreen sheet 112 and a strap 124 is fixedly attached to the end cap 125. In the preferred embodiment, the end cap 125 and strap 124 are made of a contiguous portion of canvas fabric and sewn to the sunscreen sheet 112. In the preferred embodiment, each strap 124 extends approximately twenty-four inches from its respective end cap. In several embodiments, at least one flexible magnet 520 is sewn into the strap 124 along the trailing portion (i.e., the portion intended to be in the interior of the vehicle when the strap 124 is secured by a closed door) to magnetically adhere the strap 124 to the vehicle's ferrous or otherwise magnetic interior portions and to provide mechanical resistance, at the door-door jam clamp, against forces that may pull the strap 124 toward the exterior of the vehicle.

FIG. 5B is a front view of a portion of the portable shade assembly for vehicle of the present invention 550 illustrating the cover sheet, roll and strap assembly. In the preferred embodiment, the cylindrical-shaped foam spacer members 120 are foam rolls 560 that are inserted into two canvas fabric end caps 125 with the end caps 125 each sewn to its respective canvas strap 124 and to the canvas fabric sunscreen sheet 112. In the preferred embodiment, the foam rolls 560 are fixedly attached to the sunscreen sheet 112 and to their respective end caps 125 with adhesive bonding. In several embodiments, the foam rolls 560 are covered (not shown), for example by canvas fabric. In some of these alternative embodiments, the spacer member covers (not shown) are fixedly attached to the sunscreen sheet 112, the end caps 125 or a combination of both. In other alternative embodiments, the spacer member covers (not shown) are detachably attachable to the end caps 125, for example, by zippers (not shown).

FIG. 5C is a side view of a portion of the portable shade assembly for vehicle of the present invention 590 illustrating the cover sheet, polyhedron-shaped spacer member 525 and strap assembly. An end polyhedron-shaped spacer member 525 is shown with the end of the polyhedron-shaped spacer column being covered by an end cap 525. The end cap 525 is fixedly attached to sunscreen sheet 112 and a strap 124 is fixedly attached to the end cap 525. The preferred polyhedron-shaped spacer member embodiments have the end cap 525 and strap 124 made of a contiguous portion of canvas fabric and sewn to the sunscreen sheet 112. The preferred polyhedron-shaped spacer member embodiments have each strap 124 extending approximately twenty-four inches from its respective end cap 525. As with several embodiments of the cylindrically shaped spacing members, in several embodiments of the polyhedron-shaped spacer member, at least one flexible magnet 520 is sewn into the strap 124 along the trailing portion (i.e., the portion intended to be in the interior of the vehicle when the strap 124 is secured by a closed door) to magnetically adhere the strap 124 to the vehicle's ferrous or otherwise magnetic interior portions and to provide mechanical resistance, at the door-door jam clamp, against forces that may pull the strap 124 toward the exterior of the vehicle.

Figure 6B:
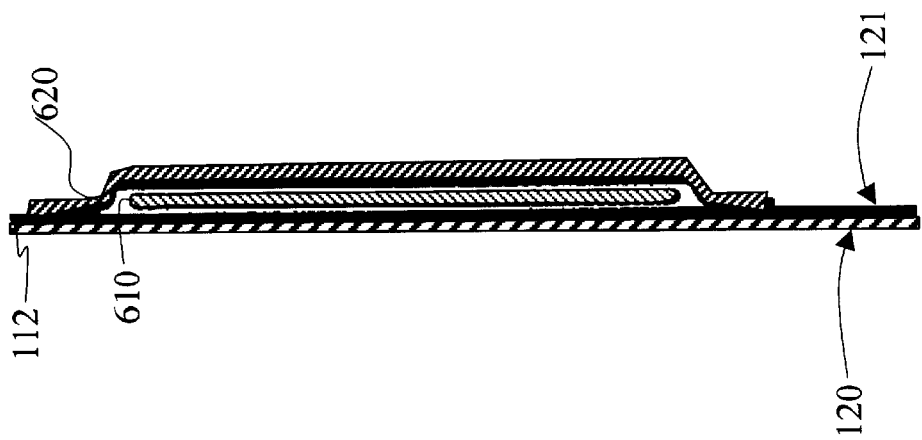
FIG. 6B is a side view of one of the sewn-in weight and magnet envelopes.
Figure 6A:
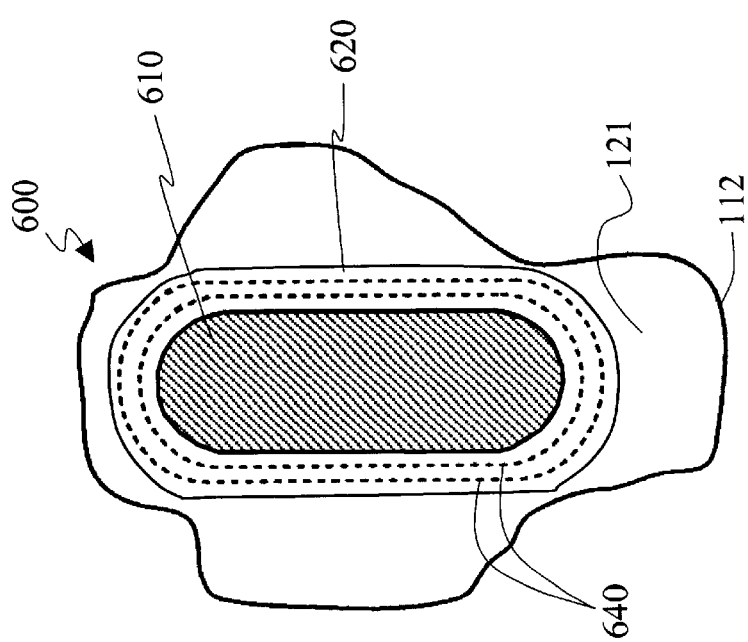
FIG. 6A is a top view of one of the sewn-in weight and magnet envelopes.

FIG. 6A is a top view of one of the sewn-in weight and magnet envelopes 600. In the preferred embodiment, an oval-shaped, substantially flat, rubber-coated, cast lead weight 610 of approximately one pound is covered by a similarly shaped, but larger piece of fabric 620, preferably of the same material from which the sunscreen member 112 derives, with the piece of fabric 620 being large enough to support a double-stitched fixing to the vehicle-facing surface 121 of the sunscreen member 112. Double stitching 640 encloses each of the weights 610 in fabric. Accordingly, a plurality of weights 610 are thereby secured proximate to each of the shorter side edges 116 of the sunscreen member 112.

FIG. 6B is a side view of one of the sewn-in weight and magnet envelopes that illustrates the substantially flat profile, approximately one-quarter inch in thickness, of the encapsulated weight 610. Alternate embodiments include flexible magnets in place or in combination with the weights. In some of these embodiments, flexible magnets are cut to size from sheets of three-sixteenths inch thick flexible rubber slab magnetic media. In these embodiments, the preferred magnetic material is multiple pole pattern rubber magnetic media.

The embodiment of the portable shade assembly for vehicle described herein in detail for exemplary purposes is subject to many different variations in structure, design, application and methodology. In particular, while three cylindrical-shaped foam spacer members 120 are illustrated in FIG. 1 are preferred in the embodiment of the invention for a passenger vehicle of full-length, an embodiment using two cylindrical-shaped foam spacer members 120 exits for vehicles of shorter length. For larger, longer vehicles, additional spacer members over the preferred three are used to produce in cooperation the sunscreen sheet 112, the air gap 310. The vertical dimension of the cylindrical-shaped foam spacer members 120 and their spacing interact to produce an air gap 310 of preferably four inches or more between the sunscreen sheet 112 and the vehicle (not shown). Additional embodiments pertaining to the regions proximate to the shorter side edges 116 include the use of magnets (not shown) with weights 114, magnets without weights and suction cups fixedly attached to the vehicle-facing surface 122 the sunscreen sheet 112 in place or in combination with the magnets and weights 114. While cylindrical-shaped foam spacer members 120 are described, and substantially right cylinder shapes are shown, for the preferred embodiment, polyhedron spacer members and right-polyhedron spacer members are suitable alternative embodiments of the present invention. While a substantially rectangular fabric sunscreen member 112 is described in the preferred embodiment, oval-shaped and vehicle contour shapes are suitable alternative embodiments of the present invention. While one strap 124 is shown for each cylindrical-shaped foam spacer member 120, an alternative embodiment has at least one strap 124 for each spacer member 120.

Many alterations and modifications may be made by those having ordinary skill in the art without departing from the spirit and scope of the invention. The words used in this specification to describe the invention in its several embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself. The definitions of the words or elements of the following claims are, therefore, defined in this specification to include not only the combination of elements which are literally set forth, but all equivalent structure, material or acts for performing substantially the same function in substantially the same way to obtain substantially the same result. In addition to the equivalents of the claimed elements, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. Therefore, it must be understood that the illustrated preferred and alternative embodiments have been set forth only for the purposes of example and that it should not be taken as limiting the invention as defined by the following claims.

I claim:

1. A portable shade assembly for a vehicle comprising:
   a substantially rectangular sunscreen member having a sky-facing surface, a vehicle-facing surface, first and second long side edges and first and second short side edges,
   a plurality of cylindrically shaped spacer members, having first and second circular base sides and a cylindrical side and having a principal axis along an axis of rotational cylindrical symmetry substantially perpendicular to the first circular base, each said cylindrically shaped spacer member being fixedly attached to the vehicle-facing surface of the sunscreen member, the principal axis of each of the cylindrically shaped spacer members traversing the sunscreen member, in an offset fashion, from the first long side edge to the second long side edge along a substantially minimal path; wherein each of said cylindrically shaped spacer members further comprises two end caps;
   a plurality of attachment straps wherein at least one attachment strap extends from each cylindrically shaped spacer member base side contiguous with each end cap and wherein each of the at least one attachment strap extends from each respective end cap; and wherein the plurality of attachment straps is adapted for secured positioning between a door and door jam of the vehicle;
   whereby the portable shade assembly is securable to the vehicle by means of the securable attachment straps.

2. The portable shade assembly for a vehicle as claimed in claim 1 wherein a foam roll is interposed between the two end caps of each of said cylindrically shaped spacer members.

3. The portable shade assembly for a vehicle as claimed in claim 2 wherein the foam rolls are adhesively bonded to the sunscreen member.

4. The portable shade assembly for a vehicle as claimed in claim 2 wherein the foam rolls are encased.

5. The portable shade assembly for a vehicle as claimed in claim 1 wherein there are two cylindrically-shaped spacer members.

6. The portable shade assembly for a vehicle as claimed in claim 1 wherein there are three cylindrically-shaped spacer members.

7. The portable shade assembly for a vehicle as claimed in claim 1 wherein at least one first weight is fixedly attached proximately to the first shorter side edge and at least one second weight is fixedly attached proximately to the second shorter side edge.

8. The portable shade assembly for a vehicle as claimed in claim 1 wherein at least one first magnet is fixedly attached proximately to the first shorter side edge and at least one second magnet is fixedly attached proximately to the second shorter side edge.

9. The portable shade assembly for a vehicle as claimed in claim 1 wherein at least one first weighted magnet is fixedly attached proximately to the first shorter side edge and at least one weighted second magnet is fixedly attached proximately to the second shorter side edge.

10. The portable shade assembly for a vehicle as claimed in claim 1 wherein at least one first suction cup is attached proximately to the first shorter side edge and at least one weighted second suction cup is attached proximately to the second shorter side edge.

11. A portable shade assembly for a vehicle comprising:
    a substantially rectangular sunscreen member having a sky-facing surface, a vehicle-facing surface, first and second long side edges and first and second short side edges, a plurality of cylindrically-shaped spacer members, having first and second circular base sides and a cylindrical side and having a principal axis along an axis of rotational cylindrical symmetry substantially perpendicular to the first circular base, each said cylindrically-shaped spacer member being fixedly attached to the vehicle-facing surface of the sunscreen member, the principal axis of each of the cylindrically-shaped spacer members traversing the sunscreen member, in an offset fashion, from the first long side edge to the second long side edge along a substantially minimal path; and
    a plurality of attachment straps; at least one attachment strap extending from each cylindrically-shaped spacer member base side; the plurality of attachment straps adapted for secured positioning between a door and door jam of the vehicle; wherein the adaptation of said plurality of attachment straps comprises straps made of fabric extending at least twelve inches from its respective base side with at least one flexible magnet fixedly attached to a portion of the strap at a length far enough from its respective base side for the at least one flexible magnet to be capable of being entrapped within the interior of the vehicle when a proximate vehicle door is closed upon the attachment strap;
    whereby the portable shade assembly is securable to the vehicle by means of the securable attachment straps.

12. The portable shade assembly for a vehicle as claimed in claim 11 wherein there are two cylindrical shaped spacer members.

13. The portable shade assembly for a vehicle as claimed in claim 11 wherein there are three cylindrical shaped spacer members.

14. The portable shade assembly for a vehicle as claimed in claim 11 wherein each of said cylindrical shaped spacer members further comprise a foam roll disposed between two end caps, wherein the at least one attachment strap is fixedly attached to each end cap and each fixedly attached attachment strap extends from each respective end cap.

15. The portable shade assembly for a vehicle as claimed in claim 14 wherein the foam rolls are adhesively bonded to the sunscreen member.

16. The portable shade assembly for a vehicle as claimed in claim 14 wherein the foam rolls are covered.

17. A portable shade assembly for a vehicle comprising:
a substantially rectangular sunscreen member having a sky-facing surface, a vehicle-facing surface, first and second long side edges and first and second short side edges, a plurality of cylindrically-shaped spacer members, having first and second circular base sides and a cylindrical side and having a principal axis along an axis of rotational cylindrical symmetry substantially perpendicular to the first circular base, each said cylindrical shaped spacer member being fixedly attached to the vehicle-facing surface of the sunscreen member, the principal axis of each of the cylindrically-shaped spacer members traversing the sunscreen member, in an offset fashion, from the first long side edge to the second long side edge along a substantially minimal path; and
a plurality of attachment straps; at least one attachment strap extending from each cylindrical shaped spacer member base side; the plurality of attachment straps adapted for secured positioning between a door and door jam of the vehicle;
wherein the adaptation of said plurality of attachment straps comprises straps made of fabric extending approximately twenty-four inches from its respective base side with at least one flexible magnet fixedly attached to a portion of the strap at a length far enough from its respective base side for the at least one flexible magnet to be capable of being entrapped within the interior of the vehicle once a proximate vehicle door is closed upon the attachment strap;
whereby the portable shade assembly is securable to the vehicle by means of the securable attachment straps.

18. The portable shade assembly for a vehicle as claimed in claim 17 wherein there are two cylindrical shaped spacer members.

19. The portable shade assembly for a vehicle as claimed in claim 17 wherein there are three cylindrical shaped spacer members.

20. The portable shade assembly for a vehicle as claimed in claim 17 wherein each of said cylindrical shaped spacer members further comprise a foam roll disposed between two end caps, wherein the at least one attachment strap is fixedly attached to each end cap and each fixedly attached attachment strap extends from each respective end cap.

21. The portable shade assembly for a vehicle as claimed in claim 20 wherein the foam rolls are adhesively bonded to the sunscreen member.

22. The portable shade assembly for a vehicle as claimed in claim 21 wherein the foam rolls are covered.

23. A portable shade assembly for a vehicle comprising:
a substantially rectangular sunscreen member having a sky-facing surface, a vehicle-facing surface, first and second long side edges and first and second short side edges, a plurality of cylindrical shaped spacer members, having first and second circular base sides and a cylindrical side and having a principal axis along an axis of rotational cylindrical symmetry substantially perpendicular to the first circular base, each said cylindrical shaped spacer member being fixedly attached to the vehicle-facing surface of the sunscreen member, the principal axis of each of the cylindrical shaped spacer members traversing the sunscreen member, in an offset fashion, from the first long side edge to the second long side edge along a substantially minimal path; and
a plurality of attachment straps; at least one attachment strap extending from each cylindrical shaped spacer member base side; the plurality of attachment straps adapted for secured positioning between a door and door jam of the vehicle;
wherein a first oval-shaped, substantially flat, rubber-coated, cast lead weight of approximately one pound is provided proximate to the first shorter side edge and a second oval-shaped, substantially flat, rubber-coated, cast lead weight of approximately one pound is provided proximate to the second shorter side edge;
whereby the portable shade assembly is securable to the vehicle by means of the securable attachment straps.

24. The portable shade assembly for a vehicle as claimed in claim 23 wherein there are two cylindrically-shaped spacer members.

25. The portable shade assembly for a vehicle as claimed in claim 23 wherein there are three cylindrical shaped spacer members.

26. The portable shade assembly for a vehicle as claimed in claim 23 wherein each of said cylindrical shaped spacer members further comprise a foam roll disposed between two end caps, wherein the at least one attachment strap is fixedly attached to each end cap and each fixedly attached attachment strap extends from each respective end-cap.

27. The portable shade assembly for a vehicle as claimed in claim 26 wherein the foam rolls are adhesively bonded to the sunscreen member.

28. The portable shade assembly for a vehicle as claimed in claim 26 wherein the foam rolls are covered.

29. A portable shade assembly for a vehicle comprising:
a substantially rectangular sunscreen member having a sky-facing surface, a vehicle-facing surface, first and second long side edges and first and second short side edges,
a plurality of polyhedron-shaped spacer members, having first and second polygon base sides and at least three longitudinal sides and having a principal axis along a longitudinal axis substantially perpendicular to the polygon base, each said polyhedron-shaped spacer member being fixedly attached to the vehicle-facing surface of the sunscreen member, the principal axis of each of the polyhedron-shaped spacer members traversing the sunscreen member, in an offset fashion, from the first long side edge to the second long side edge along a substantially minimal path; wherein each of said polyhedron-shaped spacer members further comprises two end caps;
a plurality of attachment straps wherein at least one attachment strap extends from each polyhedron-shaped spacer member base side contiguous with each end cap and wherein each of the at least one attachment strap extends from each respective end cap; and wherein the plurality of attachment straps is adapted for secured positioning between a door and door jam of the vehicle;
whereby the portable shade assembly is securable to the vehicle by means of the securable attachment straps.

30. The portable shade assembly for a vehicle as claimed in claim 29 wherein a foam polyhedron-shaped column is interposed between the two end caps of each of said polyhedron-shaped spacer members.

31. The portable shade assembly for a vehicle as claimed in claim 30 wherein the foam polyhedron-shaped columns are adhesively bonded to the sunscreen member.

32. The portable shade assembly for a vehicle as claimed in claim 30 wherein the foam polyhedron-shaped columns are encased.

33. The portable shade assembly for a vehicle as claimed in claim 29 wherein there are two polyhedron-shaped spacer members.

34. The portable shade assembly for a vehicle as claimed in claim 29 wherein there are three polyhedron-shaped spacer members.

35. The portable shade assembly for a vehicle as claimed in claim 29 wherein at least one first weight is fixedly attached proximately to the first shorter side edge and at least one second weight is fixedly attached proximately to the second shorter side edge.

36. The portable shade assembly for a vehicle as claimed in claim 29 wherein at least one first magnet is fixedly attached proximately to the first shorter side edge and at least one second magnet is fixedly attached proximately to the second shorter side edge.

37. The portable shade assembly for a vehicle as claimed in claim 29 wherein at least one first weighted magnet is fixedly attached proximately to the first shorter side edge and at least one weighted second magnet is fixedly attached proximately to the second shorter side edge.

38. The portable shade assembly for a vehicle as claimed in claim 29 wherein at least one first suction cup is attached proximately to the first shorter side edge and at least one weighted second suction cup is attached proximately to the second shorter side edge.

39. A portable shade assembly for a vehicle comprising:
- a substantially rectangular sunscreen member having a sky-facing surface, a vehicle-facing surface, first and second long side edges and first and second short side edges, a plurality of polyhedron-shaped spacer members, having first and second polygon base sides and at least three longitudinal sides and having a principal axis along a longitudinal axis substantially perpendicular to the first polygon base, each said polyhedron-shaped spacer member being fixedly attached to the vehicle-facing surface of the sunscreen member, the principal axis of each of the polyhedron-shaped spacer members traversing the sunscreen member, in an offset fashion, from the first long side edge to the second long side edge along a substantially minimal path; and
- a plurality of attachment straps; at least one attachment strap extending from each polyhedron-shaped spacer member base side; the plurality of attachment straps adapted for secured positioning between a door and door jam of the vehicle;
- wherein the adaptation of said plurality of attachment straps comprises straps made of fabric extending at least twelve inches from its respective base side with at least one flexible magnet fixedly attached to a portion of the strap at a length far enough from its respective base side cap for the at least one flexible magnet to be capable of being entrapped within the interior of the vehicle when a proximate vehicle door is closed upon the attachment strap;
- whereby the portable shade assembly is securable to the vehicle by means of the securable attachment straps.

40. The portable shade assembly for a vehicle as claimed in claim 39 wherein there are two polyhedron-shaped spacer members.

41. The portable shade assembly for a vehicle as claimed in claim 39 wherein there are three polyhedron-shaped spacer members.

42. The portable shade assembly for a vehicle as claimed in claim 39 wherein each of said polyhedron-shaped spacer members further comprise a foam polyhedron-shaped column disposed between two end caps, wherein the at least one attachment strap is fixedly attached to each end cap and each fixedly attached attachment strap extends from each respective end cap.

43. The portable shade assembly for a vehicle as claimed in claim 42 wherein the foam polyhedron-shaped columns are adhesively bonded to the sunscreen member.

44. The portable shade assembly for a vehicle as claimed in claim 42 wherein the foam polyhedron-shaped columns are covered.

45. A portable shade assembly for a vehicle comprising:
- a substantially rectangular sunscreen member having a sky-facing surface, a vehicle-facing surface, first and second long side edges and first and second short side edges, a plurality of polyhedron-shaped spacer members, having first and second polygon base sides and a at least three longitudinal sides and having a principal axis along a longitudinal axis substantially perpendicular to the first polygon base, each said polyhedron-shaped spacer member being fixedly attached to the vehicle-facing surface of the sunscreen member, the principal axis of each of the polyhedron-shaped spacer members traversing the sunscreen member, in an offset fashion, from the first long side edge to the second long side edge along a substantially minimal path; and
- a plurality of attachment straps; at least one attachment strap extending from each polyhedron-shaped spacer member base side; the plurality of attachment straps adapted for secured positioning between a door and door jam of the vehicle;
- wherein the adaptation of said plurality of attachment straps comprises straps made of fabric extending approximately twenty-four inches from its respective base side with at least one flexible magnet fixedly attached to a portion of the strap at a length far enough from its respective base side for the at least one flexible magnet to be capable of being entrapped within the interior of the vehicle once a proximate vehicle door is closed upon the attachment strap;
- whereby the portable shade assembly is securable to the vehicle by means of the securable attachment straps.

46. The portable shade assembly for a vehicle as claimed in claim 45 wherein there are two polyhedron-shaped spacer members.

47. The portable shade assembly for a vehicle as claimed in claim 45 wherein there are three polyhedron-shaped spacer members.

48. The portable shade assembly for a vehicle as claimed in claim 45 wherein each of said polyhedron-shaped spacer members further comprise a foam roll disposed between two end caps, wherein the at least one attachment strap is fixedly attached to each end cap and each fixedly attached attachment strap extends from each respective end cap.

49. The portable shade,assembly for a vehicle as claimed in claim 48 wherein the foam rolls are adhesively bonded to the sunscreen member.

50. The portable shade assembly for a vehicle as claimed in claim 48 wherein the foam rolls are covered.

51. A portable shade assembly for a vehicle comprising:
- a substantially rectangular sunscreen member having a sky-facing surface, a vehicle-facing surface, first and second long side edges and first and second short side edges, a plurality of polyhedron-shaped spacer members, having first and second polygon base sides and at least three longitudinal sides and having a principal axis along a longitudinal axis substantially perpendicular to the first polygon base, each said polyhedron-shaped spacer member being fixedly attached to the vehicle-facing surface of the sunscreen member, the principal axis of each of the polyhedron-shaped spacer members traversing the sunscreen member, in an offset fashion, from the first long side edge to the second long side edge along a substantially minimal path; and a plurality of attachment straps; at least one attachment strap extending from each polyhedron-shaped spacer member base side; the plurality of attachment straps adapted for secured positioning between a door and door jam of the vehicle;

wherein a first oval-shaped, substantially flat, rubber-coated, cast lead weight of approximately one pound is provided proximate to the first shorter side edge and a second oval-shaped, substantially flat, rubber-coated, cast lead weight of approximately one pound is provided proximate to the second shorter side edge;

whereby the portable shade assembly is securable to the vehicle by means of the securable attachment straps.

52. The portable shade assembly for a vehicle as claimed in claim 51 wherein there are two polyhedron-shaped spacer members.

53. The portable shade assembly for a vehicle as claimed in claim 51 wherein there are three polyhedron-shaped spacer members.

54. The portable shade assembly for a vehicle as claimed in claim 51 wherein each of said polyhedron-shaped spacer members further comprise a foam polyhedron-shaped column disposed between two end caps, wherein the at least one attachment strap is fixedly attached to each end cap and each fixedly attached attachment strap extends from each respective end cap.

55. The portable shade assembly for a vehicle as claimed in claim 54 wherein the foam polyhedron-shaped columns are adhesively bonded to the sunscreen member.

56. The portable shade assembly for a vehicle as claimed in claim 54 wherein the foam polyhedron-shaped columns are covered.

\* \* \* \* \*